UNITED STATES PATENT OFFICE.

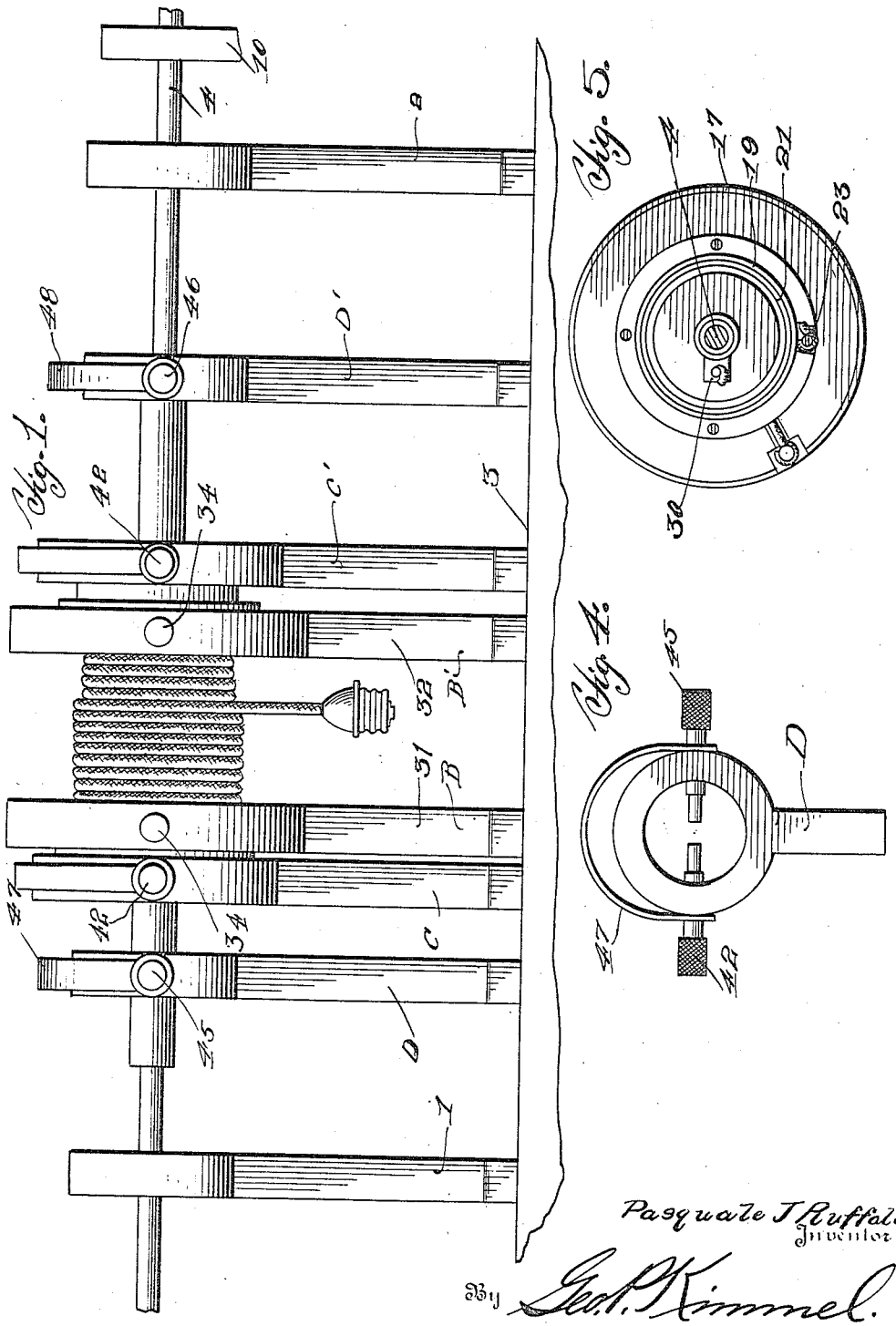

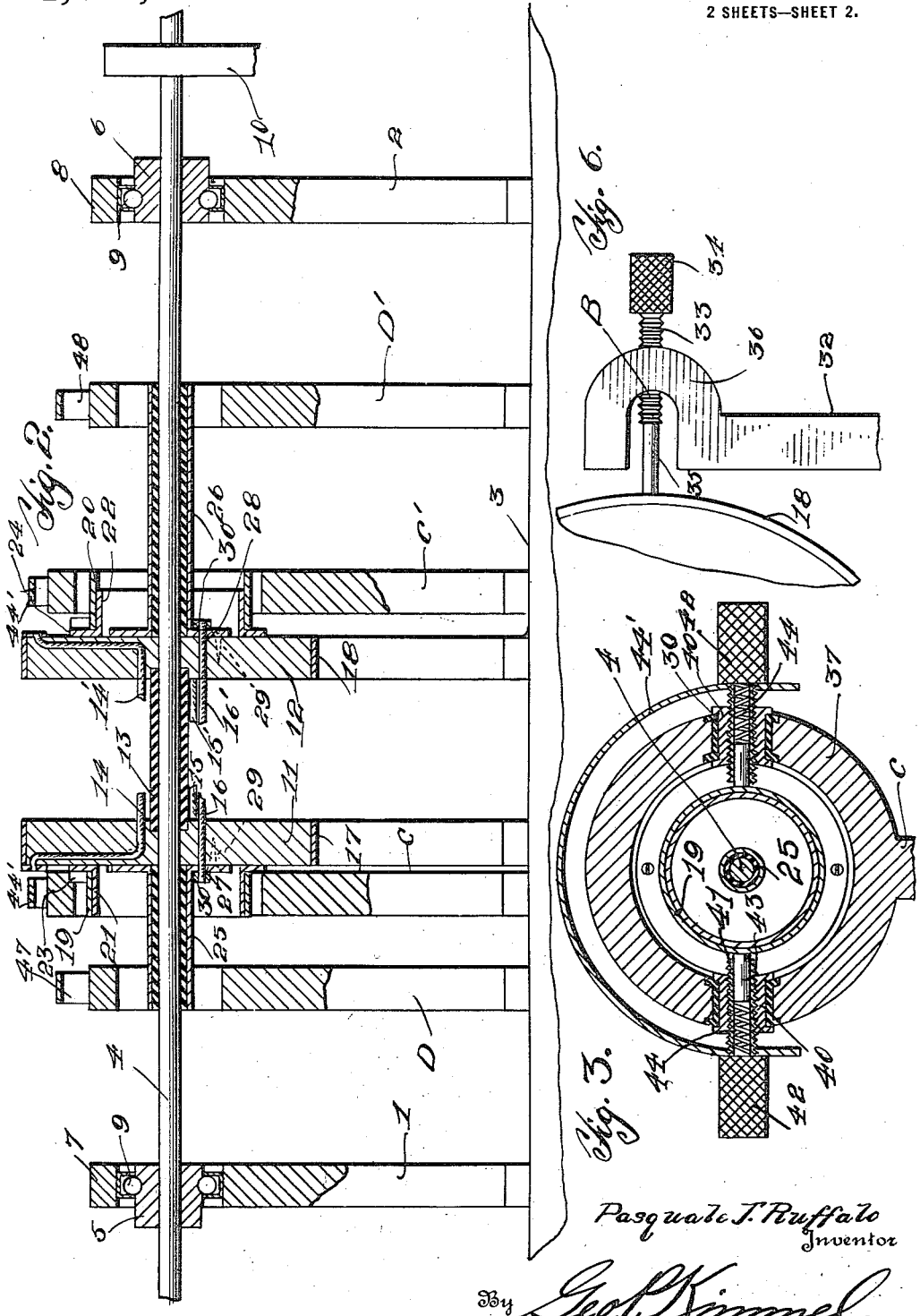

PASQUALE J. RUFFALO, OF MOUNT VERNON, NEW YORK.

WINDING AND REELING DEVICE FOR ELECTRIC CONDUCTORS.

1,245,034.   Specification of Letters Patent.   Patented Oct. 30, 1917.

Application filed May 10, 1916. Serial No. 96,587.

*To all whom it may concern:*

Be it known that I, PASQUALE J. RUFFALO, a citizen of the United States, and resident of Mount Vernon, in the county of Westchester and State of New York, have invented certain new and useful Improvements in Winding and Reeling Devices for Electric Conductors, of which the following is a specification.

The present invention relates to winding and reeling and has particular reference to new and useful improvements in winding and reeling devices for electrical conductors.

The primary object of my invention is to provide a winding reel about which may be wound an electrical conductor or conductors for use in connection with portable electrical apparatus and the like.

Another object of my invention is to provide a device of the character described having means associated therewith whereby to supply electric current to the conductors at all times, regardless of the remoteness of the electrical apparatus being supplied. My invention is particularly adapted for use in connection with portable sweeping devices driven by electric current, mine locomotives, life saving apparatus, and in fact any use to which such a device may be reasonably put.

Other objects and advantages to be derived from the use of my improved electric reel will appear from the following detail description and the claims, taken with an inspection of the accompanying drawings, in which:

Figure 1 is a side elevational view of a reel embodying the improvements of my invention;

Fig. 2 is a longitudinal sectional view of the same;

Fig. 3 is a transverse vertical sectional view of one of the brush carrying frames;

Fig. 4 is a fragmentary end elevational view of another of the brush carrying elements;

Fig. 5 is an end elevational view of one side of the reel; and

Fig. 6 is an enlarged fragmentary side elevational view of another form of brush holder employed, a portion of the reel being shown in contact therewith.

Referring more particularly to the drawings, wherein similar characters of reference designate like and corresponding parts throughout the various views, 1 and 2 designate the main bearing frame of my invention, the same being mounted on a suitable base 3. A driving shaft 4 is provided and is formed adjacent its free ends with bearing bushings 5 and 6 receivable within the head portions 7 and 8, respectively, of said bearing frames 1 and 2, suitable bearings 9 being interposed between the bushing and the head to support said shaft. One free end of the shaft is provided with a pulley 10 which may be connected to any suitable prime-mover.

The reel of my invention comprises side portions 11 and 12 formed of insulating material, said side portions being connected at their center points by means of a tubular body 13, likewise formed of insulating material. The whole reel structure is rigidly mounted on and adapted to turn with the shaft 4.

In the present instance I have provided a plurality of electrical conductors to be wound about the reel, said conductors being in sets three in number, in the present instance, and being designated 14, 15 and 16, respectively. A second set of conductors is provided including the conductors 14', 15' and 16', and when in use and supplied with current the conductors may be used in pairs, that is, conductors 14 and 14' forming the positive and negative side of a given circuit, etc. Of course, I do not limit myself to the number of conductors which may be wound about the reel.

In order to supply current to the conductors named I provide a pair of collector rings 17 and 18 carried by the side portions 11 and 12, respectively, of the reel. The collector rings are connected to the conductors 14 and 14', respectively. A second set of collector rings 19 and 20 is provided, said collector rings being mounted on supporting frames 21 and 22, respectively, said frames being carried by the outer faces of the side portions 11 and 12 of the reel. The collector rings 19 and 20 are welded or otherwise secured to the supporting members 21 and 22, the conductors 15 and 15' being connected in enlargements 23 and 24 formed on the supporting members 21 and 22. This arrangement serves the purpose which will hereinafter appear.

I provide means for supplying current to the conductors 16 and 16' said means including tubular members 25 and 26 forming inner collector ring sets, said tubular members 25 and 26 being formed with flanges 27 and 28 secured by means of screws 29 or the like to the side portions 11 and 12 of the reel. The conductors 16 and 16' are connected to the flanges 27 and 28 by virtue of the enlargements 30 formed on said flanges.

Thus it will be seen that in the provision of the conductors 14, 14', 15, 15', 16, and 16' together with their respective collector rings I afford means for facilitating supply of electric current to said conductors, the stationary current delivering members being in the form of sets of various brushes carried in suitable standards described in detail hereinafter.

Current is supplied to the collector rings 17 and 18 by means of brushes designated B and B' in their entireties, said brushes being carried in suitable brackets 31 and 32 mounted on the base 3. The structures of the brushes B and B' are identical and therefore I shall describe in detail but one of them. Referring to Fig. 6, in which one of the brushes is best shown, I provide a hollow threaded screw 33 having a knurled head 34 on the outer free end thereof and serving to receive a carbon or similar brush element 35, a suitable spring element being arranged behind the brush 35 for forcing the same into engagement with its respective collector ring. The upper end of the bracket is formed with a U-shaped head 36 which serves to semi-inclose said brush. The positive and negative sides of an external circuit may be connected to the brackets C and C' for supplying current to the conductors 14 and 14'. It will be apparent that if desired more than one brush may be provided for each of the collector rings 17 and 18, whereby in the event that one of the brushes becomes useless, current will continue to flow from the remaining brush or brushes.

Necessarily, the brackets B and B' are insulated from the base 3. I do not lay any particular stress upon the manner in which the brackets are secured to the base, since this may be modified when reducing the device in actual practice.

For supplying current to the collector rings 19 and 20 I provide a pair of brackets C and C', so designated in their entireties. One of these brackets mentioned in the foregoing is shown to advantage in Fig. 3, and since the brackets are identical in construction a brief description of Fig. 3 will suffice. In this instance, the bracket C is shown in vertical section, the upper end thereof being formed with a ring head portion 37 formed with apertures located at diametrically opposite points, said apertures having mounted therein insulating bushings 39 and metallic bushings 40. The inner peripheral surfaces of the bushings 40 are threaded to receive exteriorly threaded tubular members 41 having knurled manipulating portions 42 on the outer free end thereof. Contact brushes 43 actuated by coiled springs 44 are slidably mounted in the tubular members and adapted for engagement with the collector rings 25 or 26 as the case may be. Both brushes are intended to engage their respective collector rings simultaneously. The brush holders 41 are connected together by means of a strap 44 extending over the head 37.

Current is supplied to the collector rings 25 and 26 by means of brush members carried in brackets D and D', the brush holders being designated 45 and 46 in their entirety, said brush holders and the brushes associated therewith being practically identical in construction with the brushes 43 described in detail in the foregoing. The brush holders 45 and 46 are connected by straps 47 and 48 for a purpose similar to the straps 44. The positive and negative sides of a third external circuit are connected to the holders 45 and 46, thereby supplying current to the collector rings 25 and 26 energizing the circuit embracing the conductors 16 and 16'.

From the foregoing it will be seen that upon rotation of the shaft 4 a plurality of sets of conductors will be wound thereupon. At all times current will be supplied to the conductors by virtue of their respective collector rings being in contact with the brush members provided.

The device will be found particularly adapted for use in connection with portable electrical motors when applied to floor sweeping devices and the like wherein the current is supplied from a stationary source of power. The concentric arrangement of the collector rings is best shown in Fig. 5, the connecting means also being shown to advantage in this figure. The varying diameters of the collector ring sets prevent the possible jumping of the electric current from one set to another which might occur where alternating current is used.

From the above description taken in connection with the accompanying drawings, it is thought that a clear and comprehensive understanding of the construction, operation and advantages of my invention may be had, and while I have shown and described my invention as embodying a specific structure I desire that it be understood that I may make such changes in said structure as do not depart from the spirit and scope of the invention as claimed.

Having thus fully described my invention, what I claim as new and desire to secure by Letters Patent, is:—

1. A device of the character described, including bearing pillars, a shaft mounted on said pillars, a reel fixedly secured to the shaft, coaxial laterally extending collector sleeves secured to the opposite sides of the reel, collector rings arranged in spaced relation concentrically about said sleeves and secured to the reel sides, a plurality of standards having circular heads varying in diameter arranged adjacent said rings and sleeves, brushes carried by the annular heads and contacting with the rings and sleeves, and resilient means for connecting the extremities of the brushes.

2. A device of the character described, including bearing pillars, a shaft mounted on said pillars, a reel rotatable with the shaft and carried thereby, a plurality of coaxial collector sleeves secured to the opposite sides of the reel, collector rings arranged about the peripheral surfaces of the reel sides, standards arranged adjacent the sides of the reel and having their upper extremities formed substantially U-shaped, brushes carried by the U-shaped extremity and engaged with said collector rings, other standards arranged adjacent the collector sleeves and having circular heads of varying diameters, and brushes carried by the circular heads engaged with said collector sleeves.

In testimony whereof, I affix my signature hereto.

PASQUALE J. RUFFALO.